(12) United States Patent
Monetti et al.

(10) Patent No.: US 7,153,029 B2
(45) Date of Patent: Dec. 26, 2006

(54) SEALING DEVICE FOR A WHEEL HUB UNIT

(75) Inventors: Alfredo Monetti, Pinerolo (IT); Angelo Vignotto, Turin (IT); Claudio Savarese, Airasca (IT); Alberto Fea, Pecetto Torinese (IT)

(73) Assignee: Aktiebolaget SKF, Gothenburg (SE)

( * ) Notice: Subject to any disclaimer, the term of this patent is extended or adjusted under 35 U.S.C. 154(b) by 102 days.

(21) Appl. No.: 11/015,335

(22) Filed: Dec. 17, 2004

(65) Prior Publication Data

US 2005/0135717 A1 Jun. 23, 2005

(51) Int. Cl.
*F16C 33/76* (2006.01)

(52) U.S. Cl. ........................ 384/448; 384/489; 384/544

(58) Field of Classification Search ................ 384/544, 384/489, 477, 448; 324/173, 207.25; 301/105.1
See application file for complete search history.

(56) References Cited

U.S. PATENT DOCUMENTS

| | | | |
|---|---|---|---|
| 1,973,837 A | | 9/1934 | Youngren |
| 3,519,316 A | * | 7/1970 | Gothberg .................... 384/486 |
| 6,323,640 B1 | * | 11/2001 | Forestiero et al. .......... 324/174 |
| 2003/0002759 A1 | | 1/2003 | Yabe et al. |
| 2004/0217551 A1 | * | 11/2004 | Vignotto et al. ............. 277/549 |
| 2005/0259901 A1 | * | 11/2005 | Vignotto et al. ............. 384/448 |

FOREIGN PATENT DOCUMENTS

| | | |
|---|---|---|
| GB | 933630 | 8/1963 |
| GB | 1170815 | 11/1969 |

\* cited by examiner

*Primary Examiner*—Thomas R. Hannon
(74) *Attorney, Agent, or Firm*—Merchant & Gould P.C.

(57) ABSTRACT

Sealing device (1) for a wheel hub unit (2) which is connected to a differential (3) of a vehicle, and which is provided with a contact rolling bearing (9), the sealing device (1) being mounted in order to protect the bearing (9) from a lubricating fluid which is used to lubricate the differential (3), and presenting a first shield (22) which is integral with an outer race (10) of the bearing (9), a second shield (23) which is arranged inside the first shield (22) and which is integral with an inner race (11) of the bearing (9) and which counter-faces the first shield (22) itself, and a dynamic sealing element (24) which is interposed between the first and the second shield (23); a first static sealing element (51) being associated with a terminal border (37) of the shrink-fit portion (33a), and being arranged inside an external relief (60) in order to create a static seal with a box (5) which extends from the differential (3) to the unit (2).

9 Claims, 2 Drawing Sheets

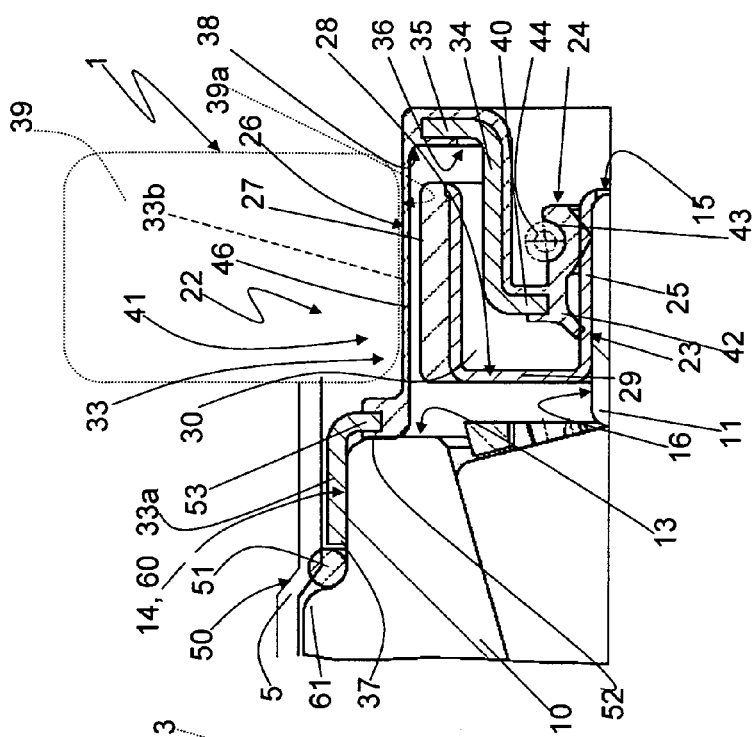
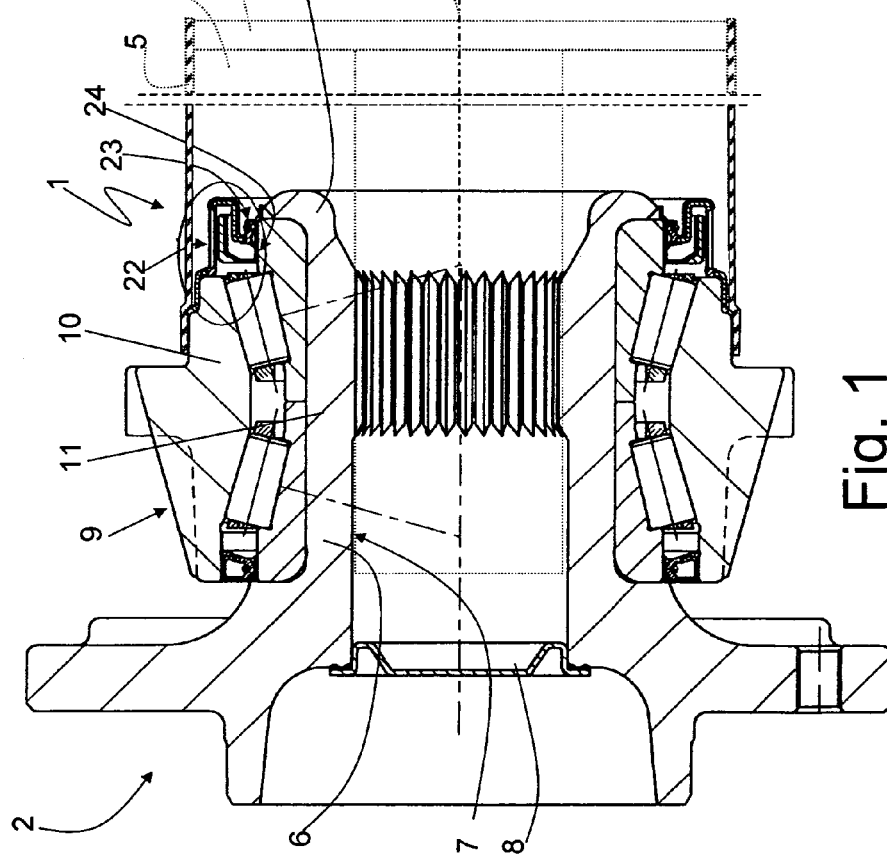

SEALING DEVICE FOR A WHEEL HUB UNIT

The present invention relates to a sealing device for a wheel hub unit.

The present invention has advantageous, but not exclusive, applications in the field of wheel hub units which are connected to the differential of a vehicle, and which are provided with a contact rolling bearing, and in which the sealing device is mounted in such a way as to protect the bearing on an inner side of the bearing, or rather on a side of the bearing which is turned towards the differential.

The description which follows will refer to this specific application as an example without, however, losing any of its general nature as a result.

In the above-mentioned description, the wheel hub unit and the differential are connected to each other by means of a semi-axis, which is arranged inside a sealing box which extends from the differential to the wheel hub unit, and which is substantially embedded in a lubricating fluid which is contained inside the sealing box in order to lubricate the differential and the semi-axis themselves. Furthermore, the sealing device comprises, in its most generic form, a first shield which is shrink fit onto an outer race of the bearing, a second shield which is shrink fit onto an inner race of the bearing, and which counter-faces the first shield, and a dynamic sealing element which is interposed between the first and the second shields.

Recent technological advances in the field of wheel hub units have lead to endowing such groups with devices for reading the kinematic parameters of the functioning of the wheel hub units themselves, such devices being encoders, which are usually integrated into the above-mentioned sealing devices in such a way as to be integral with one of the two shields, generally the more external of the two shields in relation to the bearing.

In the above-described application, however, it has been revealed that the metallic contaminating agents which are inevitably to be found in the lubricating fluid cause some disadvantages which are to the detriment, in some cases, of the signal which is generated by the encoder.

The aim of the present invention is to produce a sealing device for a wheel hub unit, which will permit the use of an encoder in an application such as, for example, the one described above without, however, giving rise to any of the above-mentioned disadvantages.

According to the present invention a sealing device for a wheel hub unit will be produced, the wheel hub unit being connected to a differential device, and being provided with a contact rolling bearing, the sealing device being mounted in such a way as to protect the bearing from a lubricating fluid which is used to lubricate the differential, and comprising:

a first shield which is provided with a shrink fit portion which is shrink fit onto an external outlet of an outer race of the bearing; and a second shield which is integral with an inner race of the bearing, and which is arranged, in relation to the bearing, inside the first shield in order to counter-face the first shield itself, the sealing device being characterised by the fact that it comprises a first static sealing element, which is associated with a terminal border of the shrink fit portion, and which is arranged inside said external outlet.

The present invention will now be described with reference to the attached drawings, which illustrate a non-limiting form of embodiment of the present invention, and in which:

FIG. 1 is a section view, with some parts in diagram form for reasons of clarity, of a first preferred form of embodiment of the sealing device for a wheel hub unit according to the present invention;

FIG. 2 illustrates, in section and on an enlarged scale, a detail of the device which is shown in FIG. 1;

Figure 3:
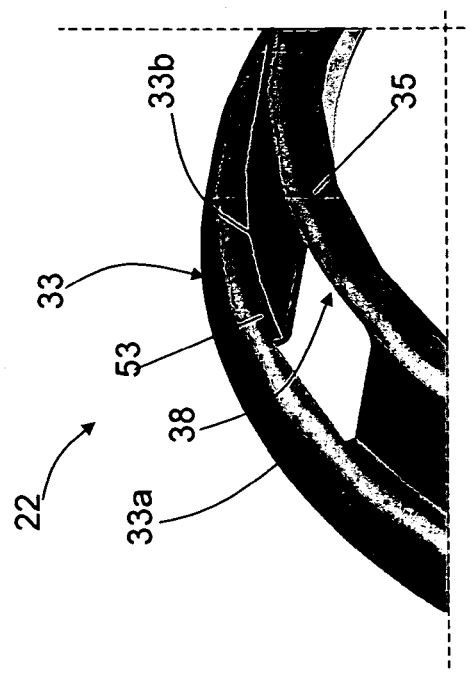
FIG. 3 is a perspective diagram view, with some parts removed for reasons of clarity, of a detail which is shown in FIG. 1.

The number 1, with reference to FIGS. 1 and 2, indicates a sealing device in its entirety for a wheel hub unit 2.

The unit 2 is suitable for being connected to a differential 3 of a vehicle by means of a semi-axis 4, which is arranged inside a sealing box 5 which extends from the differential 3 to the unit 2, and which is substantially embedded in a lubricating fluid which is contained inside the box 5 in order to lubricate the differential 3 and the semi-axis 4 themselves.

The unit 2 presents a longitudinal axis A, and comprises a tubular body 6 which is internally crossed by a cylindrical passing housing 7, which is co-axial to the axis A, and which is engaged in an axially sliding, but angularly integral, fashion by a grooved terminal portion of the semi-axis 4. The unit 2 also comprises a sealing cap 8 which is arranged in such a way as to close the housing 7, and a contact rolling bearing 9, which is mounted onto the tubular body 6 and which comprises, in its turn, a fixed outer race 10, and a rotating inner race 11 which is axially blocked on the tubular body 6 by means of a rolled blocking border 12 of the tubular body 6 itself.

The race 10 is axially delimited, by the part which is turned towards the differential 3, or rather by the internal part of the unit 2, by an outer annular surface 13 which is transverse to the axis A, and is radially delimited towards the outside by an outer cylindrical surface 14 which is transverse to and abutting the surface 13, and which presents an external relief 60 and a step 61 which is defined by the relief 60 and which axially delimits the relief 60 itself towards the inside of the bearing 9.

The race 11 projects axially in relation to the race 10, and presents an outer annular surface 15 which is transverse to the axis A and which is arranged in such a way as to abut the border 12, and an outer cylindrical surface 16 which is transverse to and abutting the surface 15. The surface 15 is axially staggered I relation to the surface 13, while both the surface 14 and the surface 16 are co-axial to the axis A, and are engaged by the device 1 in order to block the device 1 on the bearing 9, in order to arrange the device 1 in such a way as to protect the bearing 9 from the lubricating fluid which is necessary to lubricate the differential 3.

The device 1 comprises a shield 22 which is integral with the race 10, and a shield 23 which is integral with the race 11 and which counter-faces the shield 22, and a dynamic sealing device 24, which is interposed between the two shields 22 and 23, and which is integral with the shield 22.

The shield 23 is arranged inside the shield 22 in relation to the bearing 9, it is made of metallic material and it comprises a shrink fit wall 25 which is shrink fit onto the surface 16, a flange 29 which is integral with and transverse to the wall 25, and a support wall 26 which is integral with the flange 29 in order to support and encoder 27 which is used to measure an angular velocity of the bearing 9. The encoder 27 is made of magnetic material, for example elastomeric rubber, or plastic, and is radially arranged outside the walls 25 and 26, which are co-axial in relation to each other and to the axis A, and which define, in relation to each other and with the flange 29, a toroidal-shaped compartment which is axially open towards the outside of the bearing 9.

The shield 22 comprises an outer stepped wall 33 which is arranged in a position which is at least co-axial to the encoder 27. and an inner cylindrical wall 34 which is integral with the wall 33, and which extends into the compartment 28 of the shield 23. In particular, the wall 33 and the wall 34 are both made of metallic material, and they are rendered integral in relation to each other by means of an annular wall 35, which is arranged transverse to the axis A, and which defines with the walls 33 and 34 themselves a respective toroidal-shaped compartment 36 substantially inside which is arranged the encoder 27.

Figure 4:
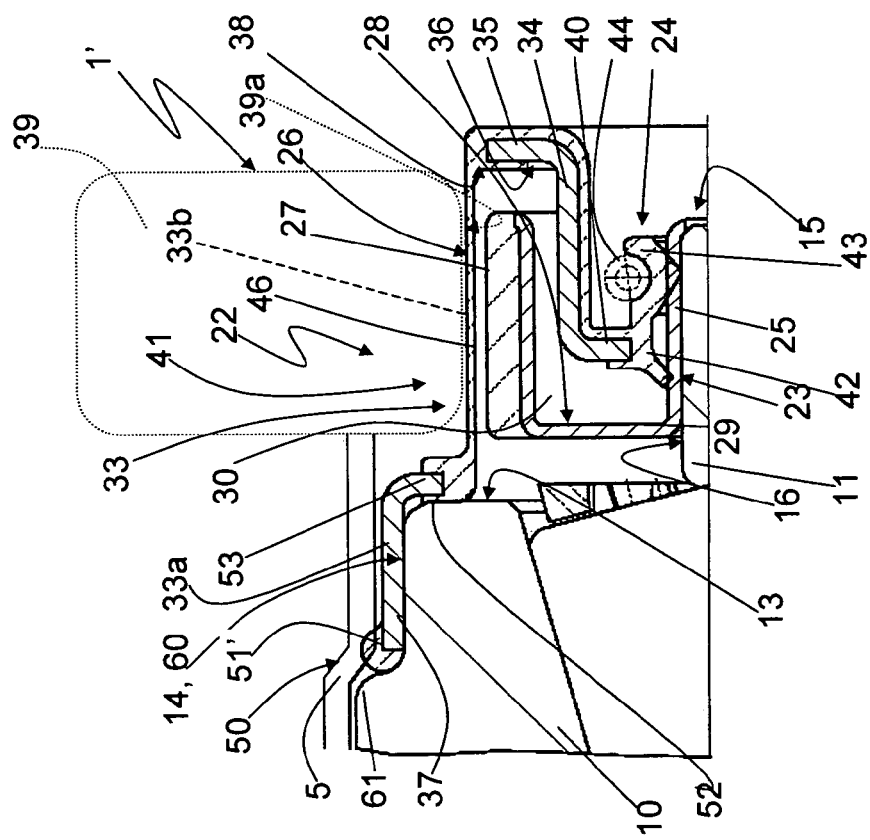
FIG. 4 illustrates, in section and on an enlarged scale, a second preferred form of embodiment of the device which is illustrated in FIG. 1.

According to the illustration which is shown in better fashion in FIG. 4, the wall 33 comprises two cylindrical portions 33a and 33b which have diameters which are different in relation to each other, and of which the cylindrical portion 33a is shrink fit inside the relief 60, and is axially delimited from the part of the step 61 by an annular peripheral border 37, while the cylindrical portion 33b internally faces the encoder 27, and is provided with a slit 38 which is suitable for being engaged by a reading sensor 39 of a signal which is generated by the encoder 27 itself.

The wall 34 presents, from the part which is opposite to the wall 35, a support border 40, which is radially turned towards the axis A in order to support the element 24.

Finally, the shield 22 comprises a lining 41 which is made of rubber material, which is arranged outside the shield 22 itself, and which completely lines the cylindrical portion 33b, the annular wall 35, the wall 34 and the border 40 from which it is distanced in order to define the sealing element 24, which in this kind of case is defined by two lips 42 and 43, of which the lip 42 axially extends towards the inside of the bearing 9 and is arranged in sliding contact on the all 25, while the lip 43 axially extends towards the outside of the bearing 9, and is also arranged in sliding contact on the wall 25, and is also provided with an annular spring 44 which is used in order to increase the sealing effect in relation to the wall 25 itself.

The lining 41 completely occludes the slit 38 as it is internally inserted in order to define a slender base diaphragm 46 which is suitable for entering into direct contact with a reading surface 39a of the reading sensor 39. In this way, not only is the surface 39a arranged in a position which is very near to the encoder 27, with the resulting advantage of reducing the air gap between the sensor 38 and the encoder 27 themselves, but, above all, the surface 39a is also arranged in contact with the diaphragm 46 from which it is thus protected against the metallic contaminating agents which are inevitably to be found in the lubricating fluid.

Finally, the device 1 comprises a static sealing element 50, which is suitable for preventing the trickling of the lubricating fluid between the cylindrical portion 33a and the outer race 10, and which in its turn comprises an O-ring 51 which is inserted inside the relief 60 between the step 61 and the border 37 in order to create a static seal together with the box 5.

Furthermore, the sealing element 50 comprises an annular lining 52, which is made of rubber material and which forms part of the lining 41 and which is integral with the shield 22, and which is arranged in such a way as to abut the surface 13. In particular, the lining 52 is integral with a connecting flange 53 which is in use between the cylindrical portions 33a and 33b, and which is arranged between the flange 53 and the surface 13 in direct contact with the surface 13 itself.

The form of embodiment of the present invention which is illustrated in FIG. 4 relates to a device 1' which is similar to the device 1, from which the device 1' differs due to the fact that the O-ring 51 of the sealing element 50 is replaced by a sealing race 51', which is arranged inside the relief 60 between the border 36 and the step 61, and which is integral with the border 36 itself, or rather which is closely connected, by means of vulcanisation for example, to the border 36 in order to be mounted on the bearing 9 together with the device 1.

It is not intended that the present invention should be limited to the forms of embodiment which are herein described and illustrated, which should be considered as examples of forms of embodiment of a sealing device for a wheel hub unit and which might be subject to further modifications which relate to the shape and disposition of the relevant parts, as well as to details pertaining to construction and assembly.

The invention claimed is:

1. Sealing device and wheel hub unit, the wheel hub unit being connected to a differential device, and being provided with a contact rolling bearing, the sealing device being mounted in such a way as to protect the bearing from a lubricating fluid which is used to lubricate the differential, the sealing device and wheel hub unit comprising:
   a first shield provided with a shrink fit portion which is shrink fit onto an external relief of an outer race of the bearing; and
   a second shield which is integral with an inner race of the bearing, and which is arranged, in relation to the bearing, inside the first shield and opposing the first shield,
   wherein the sealing device comprises a first static sealing element, which is associated with a terminal border of the shrink fit portion, and which is arranged inside said external relief.

2. Sealing device and wheel hub unit according to claim 1, wherein the first static sealing element is defined by a sealing race, which is mounted inside the an external outlet to create a static seal with a sealing box which extends from the differential to the wheel hub unit, and wherein the sealing box is independent in relation to the terminal border.

3. Sealing device and wheel hub unit according to claim 1, wherein the static sealing device is defined by a sealing race which is mounted inside the external relief in order to create a static seal with a sealing box which extends from the differential to the wheel hub unit, and wherein the sealing box is integral with the terminal border.

4. Sealing device and wheel hub unit according to claim 3, further comprising a second static sealing element, which is made of rubber material in order to partially line the first shield, and which is interposed between a frontal surface of the outer race and the shrink fit portion.

5. Sealing device and wheel hub unit according to claim 4, further comprising a diaphragm suitable for being placed in contact wit a reading surface of a sensor for reading a signal which is generated by an encoder.

6. Sealing device and wheel hub unit according to claim 1, further comprising a dynamic sealing element which is interposed between the first and second shields.

7. Sealing device and wheel hub unit according to claim 1, wherein the second shield comprises a shrink fit wall which is made of metal material, and which is shrink fit onto the inner race, and a support wall which is integral with the shrink fit wall and which supports a cylindrical encoder; the encoder being integral with a device for the measurement of an angular position of the bearing.

8. Sealing device and wheel hub unit according to claim 7, wherein the first shield comprises a metal stepped wall, and which is integral with the outer race by the shrink fit portion, and which is arranged co-axially in relation to the encoder, and which is provided with at least one slit which is suitable for being engaged by a reading sensor of a signal which is generated by the encoder.

9. Sealing device and wheel hub unit according to claim 8, wherein the first shield comprises a lining (41) which is made of rubber material, and which is arranged in such a way as to totally cover the slit, and which is provided with a base diaphragm; the base diaphragm being used to close the slit, and to separate and seal the encoder from the outside of the device.

* * * * *